United States Patent [19]

Lochner

[11] 4,253,032
[45] Feb. 24, 1981

[54] UTILIZATION OF WAVE MOTION

[76] Inventor: Johannes P. A. Lochner, 13 Aberdour Crescent, Humewood Extension, Port Elizabeth, Cape Province, South Africa

[21] Appl. No.: 969,213

[22] Filed: Dec. 13, 1978

[51] Int. Cl.³ ............... F03B 13/10; F03B 13/12; F16D 31/02; F04B 17/00
[52] U.S. Cl. ............................. 290/53; 290/42; 60/398; 60/497; 60/501; 417/330
[58] Field of Search ............ 290/42, 53; 60/398, 60/497, 501; 417/330–334, 337, 100

[56] References Cited
U.S. PATENT DOCUMENTS

| | | | |
|---|---|---|---|
| 1,372,943 | 3/1921 | Constantinesco | 417/330 |
| 3,922,739 | 12/1975 | Babintseu | 9/8 R |
| 4,081,962 | 4/1978 | Liu et al. | 60/501 |
| 4,139,984 | 2/1979 | Moody et al. | 60/398 |
| 4,189,918 | 2/1980 | Moody et al. | 60/398 |
| 4,198,821 | 4/1980 | Moody et al. | 60/398 |

*Primary Examiner*—B. Dobeck
*Assistant Examiner*—John B. Conklin

[57] ABSTRACT

A power unit comprises a resonator having a mouth located in the sea and containing a body of water and an air cushion above the body of water. This resonator can have a neck defining a relatively small flow area compared with the surface area of the body of water immediately below the cushion. The air cushion is controlled to cause the water to resonate in response to pressure fluctuations resulting from wave motions in the sea, thereby developing fluctuations of increased pressure. The unit is constructed so that the increased pressure fluctuations create a fluid flow, which is then utilized in a suitable manner.

4 Claims, 11 Drawing Figures

UTILIZATION OF WAVE MOTION

This invention relates to the utilisation of wave motion, particularly the motion of sea waves.

In the past attempts have been made to utilise energy from the sea. There are three basic ways in which these attempts have been made. Firstly, floats have been used to follow the wave motion and to generate power. Secondly, sea waves have been used, for example, by generating power as sea water flows over or through a dam. The third basic method, which has been considered for the purpose of generating a minimal amount of power, is to use sea water to blow air through an orifice in, for example, a floating buoy to cause a whistling sound.

These prior proposals have only met with limited success and it is an aim of the present invention to provide an improved method and unit for utilising power from the sea.

According to the invention, there is provided a power unit comprising a resonator having a mouth located in the sea and containing a body of water and an air cushion above the body of water; the air cushion being controlled to cause the water to resonate in response to pressure fluctuations resulting from wave motions in the sea, thereby developing fluctuations of increased pressure, and the unit being constructed so that the increased pressure fluctuations create a fluid flow; and means for utilising the fluid flow so created.

The resonator may be a Helmholtz resonator and have a neck defining a relatively small flow area compared with the surface area of the body of water immediately below the cushion. Means may be provided for controlling the pressure of the air forming the air cushion for tuning the resonator to provide a suitable resonance in response to wave motion. Such controlling means may comprise a sensor in the resonator and a compressor for providing adjustment of air pressure in the resonator in response to pressure sensed by the sensor.

The means for controlling the fluid flow may include an outlet above the neck of the resonator and through which water can be forced, for example, into a pressure tank. The water from the pressure tank may be fed to a turbine for driving an alternator or generator to generate power. Alternatively, the mouth of the resonator may be provided with vanes for directing water flowing from the mouth. This water flow can be used, for example, to propel a boat or ship.

The invention also extends to a method of generating power, which comprises providing a resonator having a mouth located in the sea so that the resonator contains a body of water and an air cushion; controlling the pressure of the air cushion and thereby causing the water in the resonator to resonate in response to pressure fluctuations resulting from wave motions in the sea so that fluctuations of increased pressure are developed; causing the increased pressure fluctuations to create a fluid flow; and utilizing the fluid flow so created to generate power.

The invention further extends to an apparatus for use in a power unit, the apparatus having a chamber for receiving an air cushion and a body of water below the air cushion and having a mouth for locating below sea level for placing a body of water in the chamber in direct fluid communication with the sea; a sensor for sensing pressure in the chamber; air control means for increasing or decreasing air pressure in the chamber to create resonant conditions and means for utilising fluid flow created as a result of said resonant conditions.

The apparatus can comprise a pair of resonators of different heights and arranged substantially side-by-side with sensors in both of the resonators and means for controlling the pressures of air cushions therein for normally maintaining resonant conditions in said resonators.

Embodiments of the invention will now be described, by way of example, with reference to the accompanying drawings, in which.

As shown in FIG. 1, an ocean-swell-tuned Helmholtz resonator 10 is substantially in the form of an inverted cylinder having a closed upper end and an open lower end providing a mouth 12. The mouth 12 of the resonator is located below sea level and, as shown, the resonator is filled with water to a variable level 14. An air cushion 16 is formed above the water level 14.

The still water level of the ocean is shown at 18 and a wave is shown at 20, the height of the wave peak being illustrated at 22.

The column of water in the resonator is acted on by the wave motion and, by suitably controlling the pressure of the air cushion 16, it is possible to ensure that the water in the resonator will resonate at the wave frequency. Thus, it is possible to develop relatively intense pressure fluctuations in the air cushion and the water below.

Figure 1A:
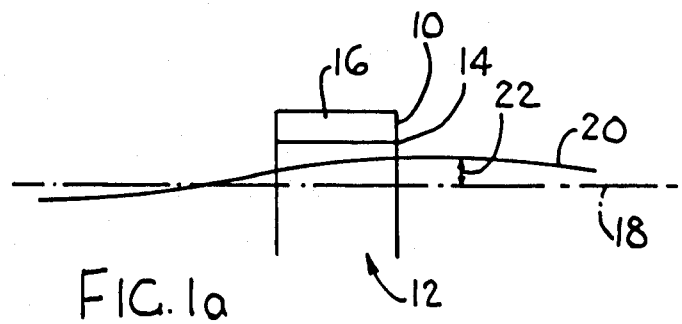
FIG. 1a is a schematic diagram of a resonator having a mouth located below sea level and FIG. 1b is an analogous electrical circuit.
Figure 1B:
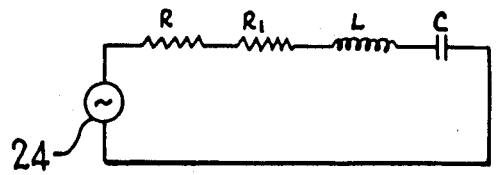

In order to determine the characteristics of such a resonator, it is possible to use an analogous electrical circuit as shown in FIG. 1b. This circuit includes a power generator 24 for generating a voltage which is analogous to the ocean wave pressure fluctuations 20; and an inductance L which is analogous to the mass of the water column in the resonator. Capacitance C represents the air cushion 16 above the mass of water and energy lost through radiation of waves from the mouth of the resonator is represented by the energy lost through resistance R. The energy extracted from the resonator for power generation purposes, together with coincidental losses such as viscous drag are represented by resistance R1.

Figure 2:
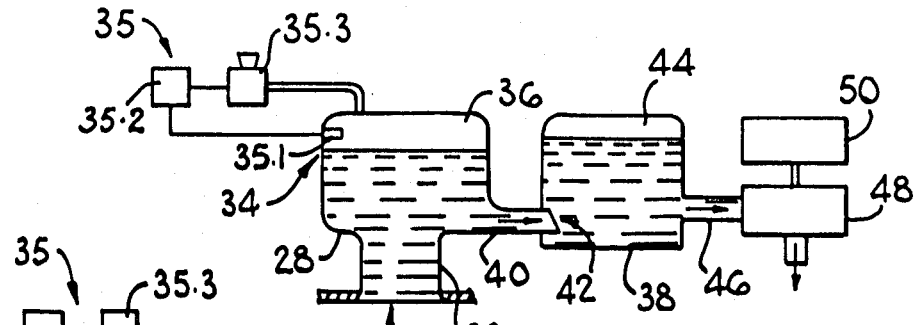
FIG. 2 is a schematic diagram showing a power unit.

The power generation unit of FIG. 2 is based on the principles illustrated in connection with FIGS. 1a and 1b. The unit includes a Helmholtz resonator 26 having a primary chamber 28 and a downwardly extending neck 30. The lower end of the neck 30 defines a mouth 32. The resonator is filled with a body of water up to a movable water level 34 and an air cushion 36 is formed above the body of water. A pressure control system 35 is provided for controlling the pressure of the air defining the air cushion 36 for tuning the resonator. The system 35 has a sensor 35.1 mounted in the air cushion 36 and this is connected to a control device 35.2 for controlling the operation of a reversible compressor 35.3. The reversible compressor can increase or decrease the pressure in the cushion 36 until resonance is obtained. The resonator is mounted with the neck extending below sea level.

The resonator 10 is connected to a pressure tank 38 by an outlet 40 including a non-return valve 42. The valve is designed to allow substantially full-bore flow through the outlet 40.

As shown in the drawing, the tank 38 has an air cushion 44 at its upper end and this is intermittently compressed by flow of water through the outlet 40 into the tank and serves to stabilise the flow of water from the pressure tank through an outlet 46 to a turbine 48. The turbine may be any standard water turbine and is connected to drive an alternator 50, another electrical generator or any other suitable equipment.

A plurality of resonators can be arranged to feed the pressure tank if desired.

When the water in the resonator is subjected to wave motion, the mass of water resonates with the compliance of the air above the water. Intense pressure fluctuations are developed above the neck of the resonator and water is forced through the outlet 40 and valve 42 into the tank. The water leaves the tank through the outlet 46 and then drives the turbine 48.

Figure 5:
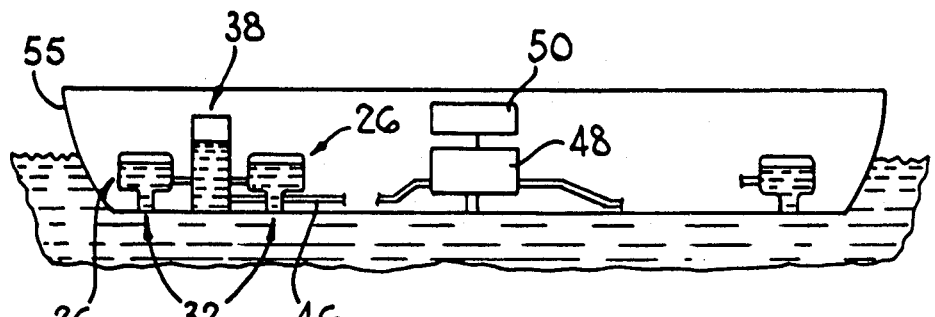
FIG. 5 shows diagrammatically one form of generating station.

As shown in FIG. 5, a generating station comprises a floating hull 55 in which a plurality of resonators 26 like that of FIG. 2 are mounted. Each of the resonators is arranged with its mouth 32 opening through the bottom of the hull at a location which is permanently below sea level. The resonators are arranged in pairs with outlets 40 of the resonators of each pair communicating with a single pressure tanks 38. The pressure tanks are again arranged to supply water to drive the turbine 48 and thus the generator 50. The hull 50 can be moved at any suitable location. Naturally, the generating station need not be a floating one.

Figure 3A:
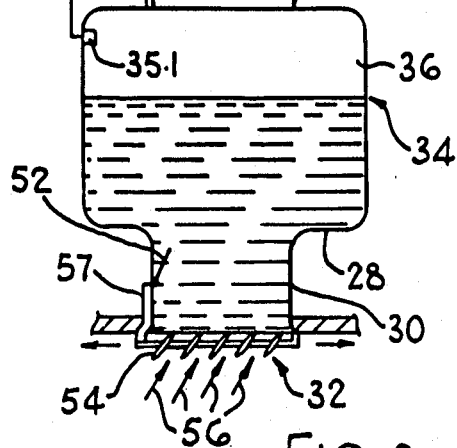
FIG. 3a is a schematic diagram showing a propulsion system.
Figure 3B:
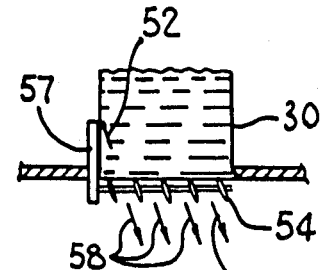
FIG. 3b shows an alternative position of part of the system.

Referring now to FIGS. 3a and 3b, a resonator 26 which is similar to the resonator of FIG. 2 is mounted in a ship or boat (not shown). The parts of this resonator are indicated by the same reference numerals as those used in FIG. 2. The resonator is again provided with a pressure control system for controlling the pressure of the air cushion 36 and the mass of the water in the neck 30 again resonates with the compliance of the air cushion.

A board or similar device 52 is pivotally mounted on the inside wall of the neck at one side of the neck. This board is connected to a set of streamlined vanes 54 by a coupling 57 so that water rushing into the resonator pivots the board upwardly and serves to tilt the vanes. Conversely, water rushing out of the resonator pivots the board downwardly and tilts the vanes to an opposite angle. In this way, water can be caused to enter the resonator in the direction of arrows 56 and is driven from the resonator in the direction of arrows 58 (FIG. 3b). The water rushing in and out of the resonator between the vanes thus exerts a fluctuating force on the ship carrying the vanes and this force can be used to propel the ship. Of course, any suitable number of resonators of different shapes and sizes can be used in this manner.

Figure 6A:
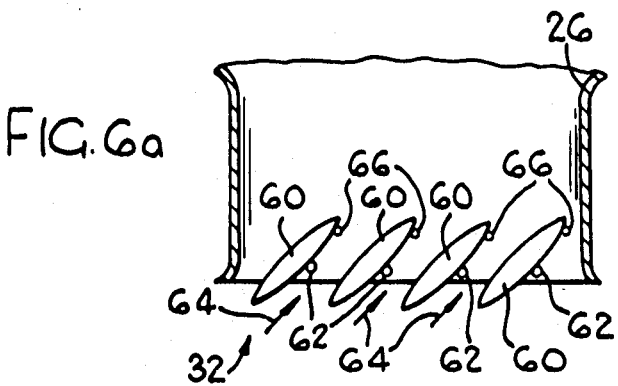
FIG. 6a and 6b show flow-directing vanes.
Figure 6B:
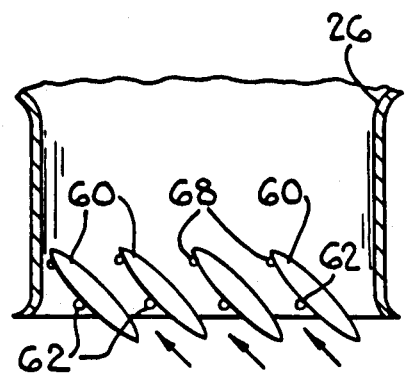

Instead of using the board 52 and coupling 57, it is possible to use self-orientating vanes 60 as shown in FIGS. 6a and 6b. These vanes are symmetrical vanes each pivotally mounted towards one side on pivots 62 fixed to the mouth of the resonator 26. As the water flows into the resonator mouth 32 in the direction of arrows 64, the vanes 60 automatically rotate in a clockwise direction until further movement is limited by stops, shown diagrammatically at 66. The inclination of the vanes to the horizontal is then 45°. On the other hand, as water flows out of the mouth, the vanes 60 rotate in an anticlockwise direction until they strike schematically illustrated stops 68. The direction of flow of the water longitudinally of the ship is thus reversed automatically by the vanes.

A resonator arrangement similar to that of FIG. 2 can also be used to drive a ship or boat, in which case the flow through outlet 40 is guided to a nozzle for driving the ship.

As ocean waves have a fairly wide frequency spectrum but normally have one predominant frequency at which a maximum amount of energy can be extracted, the resonator should suitably be tuned to this predominant frequency. Tuning can be effected by adjusting the air pressure of the air cushion 36 in the resonators of FIGS. 2 and 3a. Correct tuning is indicated by a maximum pressure fluctuation above the water level, which can be measured by means of sensors 35.1.

Figure 4A:
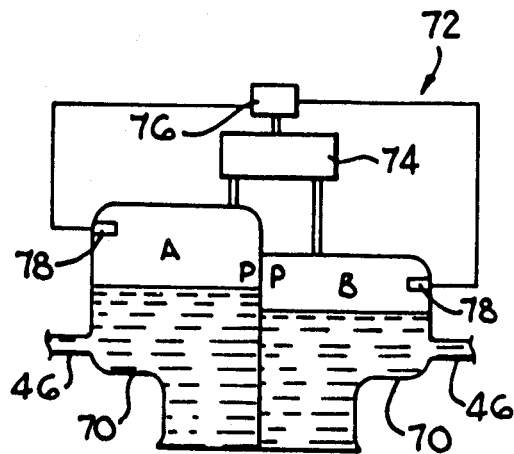
FIGS. 4a, 4b and 4c are provided to illustrate tuning of a resonator.
Figure 4B:
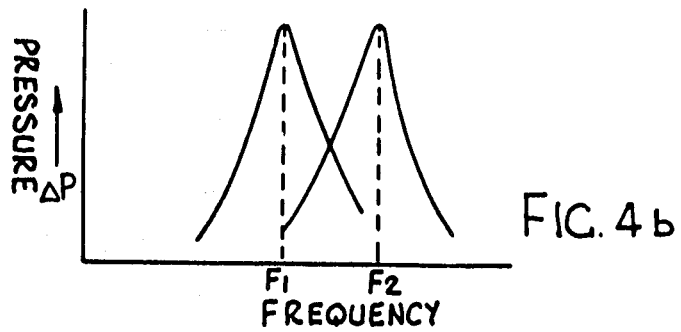

In practice, an automatic hill climbing mechanism is desirable in order to keep the resonator tuned to the correct frequency. For this purpose, two resonators 70 of different heights are arranged side by side as shown in FIG. 4a. The same air pressure initially exists in both air spaces above the water and the resonant frequencies of both resonators increase with an increase in pressure. However, there is a difference in resonant frequency as shown in FIG. 4b, the lower resonator responding to the higher frequency.

Figure 4C:
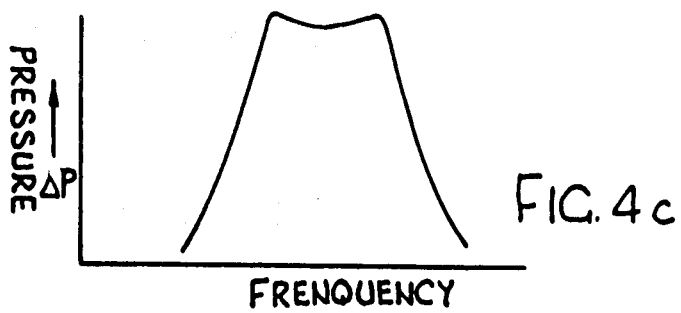

A relatively flat-topped resonance curve, as shown in FIG. 4c, can be obtained if the power in the two resonators is added. A maximum amount of power is obtained from the combined system when the peaks for the two resonators in FIG. 4b are substantially the same.

The resonators are both connected to an arrangement 72 including a reversible compressor 74 for pumping air pressure up or down so that, when the air pressure fluctuations in the air cushion marked A are smaller than those in the air cushion marked B, the compressor is automatically switched by control device 76 to raise the pressure in the cushions A and B until the pressure fluctuations in the two resonators are substantially the same. When the air pressure fluctuations in cushion B are smaller than those in cushion A, the compressor is automatically switched to reduce the pressure in the cushions A and B until the pressure fluctuations in the two resonators become approximately the same. The pressure fluctuations are measured by sensors 78. Thus, the system is automatically set to absorb the maximum amount of wave energy.

The tuning of the resonators can be taken off the resonant frequency by means of a pressure increase or reduction when reduced power is required. This is particularly important when a resonator is used to propel a ship, as described with reference to FIG. 3. Of course, a ship being driven by the resonator system can be put into reverse by changing the connection 57 between the board 52 and vanes 54 to reverse their operation. An auxiliary engine will normally be required for a resonator driven ship.

The resonators described can be used in floating break water units consisting of at least two resonators per unit and a similar hill climbing mechanism to that described with reference to FIG. 4a can be used for tuning the resonators. Energy can be dissipated by providing suitable leaks above the throats of the resonators at a connection between the resonators and a pressure tank similar to that of FIG. 2.

I claim:

1. A power unit comprising a resonator having a mouth located in the sea and containing a body of water;

air cushion means above the body of water, said resonator having a neck defining a relatively small flow area compared with a surface area of the body of water immediately below the air cushion means;

means controlling the air cushion means comprising a sensor in the resonator and a compressor for providing adjustment of air pressure in the resonator in response to pressure sensed by the sensor for causing the water to resonate in response to pressure fluctations resulting from wave motions in the sea, thereby developing fluctations of increased pressure;

said unit being constructed so that the increased pressure fluctations create a fluid flow; and means for utilizing the fluid flow so created.

2. A unit according to claim 1, wherein the means for utilising the fluid flow includes an outlet above the neck of the resonator and through which water can be forced, means for relatively stabilising the flow of fluid leaving the resonator through the outlet, and means for generating power by using said fluid flow.

3. A unit according to claim 1, wherein the means for utilising the fluid flow includes means for directing water flowing from the mouth of the resonator.

4. A unit according to claim 1, including two resonators of different heights and arranged substantially side by side, the resonant frequencies of both resonators and the pressures of the air cushions therein being such that the pressure fluctuations in the two resonators are substantially the same.

* * * * *